United States Patent Office 3,468,717
Patented Sept. 23, 1969

3,468,717
ELECTRODES HAVING AN INTIMATE MIXTURE OF PLATINUM AND A SECOND METAL
Robert F. Waters, Hammond, and Hurley D. Cook, Highland, Ind., assignors to Standard Oil Company, Chicago, Ill., a corporation of Indiana
No Drawing. Continuation of application Ser. No. 299,101, July 31, 1963. This application Nov. 17, 1966, Ser. No. 595,267
Int. Cl. H01m 13/06
U.S. Cl. 136—120
6 Claims

ABSTRACT OF THE DISCLOSURE

Electrodes having an intimate mixture of platinum and a second metal, the platinum being less than 10 weight percent of the electrode, and the second metal being less than 5 weight percent of the platinum, and the second meatl being one or more of the following: vanadium, copper, manganese, molybdenum, tungsten and cerium. The electrode is prepared by impregnating the electrode support with salts of platinum and the second metal, reducing at least a portion of the salts, and heating the reduced product at a temperature from 700° C. to 1400° C. in an inert atmosphere for a sufficient time to produce the intimate mixture.

---

This is a continuation of our copending application Ser. No. 299,101, filed July 31, 1963, now abandoned.

This invention relates to electrochemical cells and more particularly it relates to fuel cells employing novel platinum electrodes which contain a second metal in addition to platinum, and especially to a process for preparing the electrode.

Fuel cells adapted for producing electrical energy directly from chemical fuels are well known (see "Fuel Cells," edited by G. J. Young, Reinhold Publishing Corporation, New York, N.Y., 1960). In general, fuel cells are electrochemical devices which convert the chemical energy of a fuel directly into electrical energy by the oxidation of fuel supplied to the cell.

Typically gaseous fuel such as hydrogen, carbon monoxide, alcohol, propane, and other hydrocarbon or hydrocarbon-derived fuel is supplied to one of the electrodes. Liquid fuels may also be employed, such as the liquid alcohols. An oxidant such as oxygen or air is supplied to the other electrode. Usually these electrodes have a catalytic agent on their surface to promote the formation of electrons at the fuel electrode and the consumption of electrons at the oxidant electrode, with the electrolyte providing a medium for the ionic transportation of an electrical charge between electrodes. For examples, a fuel such as methane when fed to a fuel electrode will form electrons and products of oxidation. Oxygen, as the oxidant, when fed to the other electrode, will take up electrons and form reduction products, leaving the electrode charged with a positive value. The electrolyte, commonly an acidic or alkaline type, is the medium by which the ionic transfer of the electrical charges takes place. The resultant electrical charges on the individual electrodes furnish an electrical current for an external circuit.

The overall efficiency of a fuel cell is directly related to the promotional effect of the catalytic agent on the individual electrodes. The greater the activity of the catalytic agent, the smaller the energy loss required to promote the formation of the electrons at the fuel electrode and the consumption of the electrons at the oxidant electrode. By reducing the amount of this energy loss in the cell, the efficiency and output of the cell are naturally increased.

In the past, platinum has been found very desirable as a catalytic agent for electrodes in a fuel cell employing a hydrocarbon or a hydrocarbon-derived fuel, and an oxidant. Generally, the platinum is placed on an electrode support, usually electrically conducting such as porous carbon, to increase its surface area and to minimize the cost of the electrode.

However, the present platinum electrodes are not entirely satisfactory in that excessive voltages are required to promote the desired reactions at the fuel and oxidant electrodes. If this activation voltage (or activation polarization as it is sometimes known) could be reduced, it would improve the efficiency of the cell and result in a more practical fuel cell.

An object of this invention is the reduction of the activation polarization of a platinum electrode in a fuel cell. Another object is the improvement in the operation of a fuel cell. Other objects will become apparent from the detailed description of the invention.

It has been discovered that a platinum electrode which contains a small amount of a second metal exhibits reduced activation polarization. The second metal is a transition metal having an atomic number of about 21–29, 39–47, or 57–76, or an earth metal having an atomic number of 58 or 90. In many instances, the beneficial amount of the second metal depends on the particular metal employed and the particular method of preparation; however, amounts in the order of 2 atomic percent based on platinum appear to be common to most metals. Variations in the limits of the range also depend on the particular metal. At least part of the second metal is in intimate mixture with a portion of the platinum. This result is obtained by heating platinum containing finely divided second metal, at a high temperature (above about 500° C.) to produce the intimate mixture. Usually first the salts of platinum and the second metal are utilized to impregnate a suitable support, such as porous carbon; after which reduction to the metals is carried out. The reduction step is followed by the high temperature treatment although for some reduction methods such as thermal reduction, the reduction and high temperature steps can be carried out at the same time.

The electrode of the invention is therefore an improved platinum electrode containing small amounts of the second metal which is, at least in part, in an intimate mixture with a portion of platinum. The mixture improves the efficiency and operation of the electrode and reduces the activation polarization. Although it has not been determined with complete certainty, it is thought that the intimate mixture is made up of highly divided particles of the second metal and platinum, and includes various stages of alloy formation.

The second metal is normally one or more of the transition metals, especially those having an atomic number of about 21–29, in which vandadium, manganese, copper, iron and nickel are preferred; 39–47 in which molybdenum and silver are preferred; and 57–76, in which tungsten is preferred; or a rare earth such as cerium or thorium, in which cerium is preferred. The support for the metals is usually electically conducting and preferably porous to provide a high surface area for the electrode, but is not limited to such characteristics. Porous carbon supports are generally described in co-pending application S.N. 133,228, filed Aug 22, 1961, and now abandoned.

Small amounts of the second metal in the platinum on the electrode produce the desired results. These amounts generally depend on the particular metal employed. Naturally, when the formulation is based on the salts of platinum and the second metal, the degree of the reduction of the salts to the metals determines the amount of the second metal in the platinum electrode. In general, the amount of the second metal in the platinum electrode may range from about 0.001 wt. percent to about 5 wt. percent, based on platinum. The platinum content is usually in the order of about 0.1–10 wt. percent and preferably about 0.5–10 wt. percent of the electrode support.

As stated above, the performance of an electrode prepared from a formulation of the metallic salts will depend on the degree of reduction of the salts to the metals. When the reduction is insignificant, the electrode performance may be less than that of a platinum electrode containing no second metal. However, salt formulations of about 1–25 atomic percent and preferably about 5–10 atomic percent of copper based on the platinum content of its salt result in a very suitable cathode when the copper salt is copper sulfate and the platinum salt is chlorplatinic acid which are impregnated on the support in an amount to produce about 1 wt. percent of platinum and the reduction is carried out with hydrazine for approximately 16 hours, after which the impregnated support is calcined at about 800° C. The electrode is utilized with a sulfuric acid paste made from about 30 wt. percent $H_2SO_4$. The highly desirable results of electrodes prepared from the salts of other metals are noted when an anode is prepared from (1) about 1–5 atomic percent and preferably about 1–2 atomic percent of vanadium as vanadyl sulfate, (2) about 2 atomic percent of molybdenum as ammonium molybdenate, (3) about 2 atomic percent of tungsten as ammonium metatungstate, (4) about 1–2 atomic percent and preferably about 2 atomic percent of cerium as cerium ammonium sulfate; and when a cathode is prepared from (5) about 1–7 atomic percent and preferably about 4–7 percent of manganese as manganese sulfate, (6) about 1–7 atomic percent and preferably about 2 atomic percent of molybdenum as ammonium molybdate, (7) about 4–7 atomic percent and preferably about 4 atomic percent of tungsten as ammonium metatungstate, and (8) about 2 atomic percent of cerium as cerium ammonium sulfate.

The improved platinum electrode containing the small amount of the second metal is prepared by (1) impregnating a suitable support with thermally reducible salts of platinum and the second metal to produce a co-dispersion of the salts and (2) by treating the co-dispersion to a high temperature in an inert atmosphere for a sufficient time to reduce at least a portion of the salts to the metallic form and produce an intimate mixture composed of a portion of the platinum and at least part of the second metal. The treatment results in an electrode which exhibits reduced activation polarization when employed in a fuel cell. The first step is generally carried out by saturating a porous support such as porous carbon with a suitable solution of the thermally reducible salts. Commonly, these salts may be the salts of organic acids which decompose to form the metal when heated to a high temperature (100–300° C.). Acetates, formates, citrates, and the like are suitable.

In preparing the electrode, a co-dispersion of the salts is utilized. By a co-dispersion it is meant a plurality of particles of each salt, preferably in a finely divided state so as to aid in the production of the intimiate mixture at a later state.

The electrode may also be prepared by (1) impregnating a suitable support with a co-dispersion of salts of platinum and the second metal, (2) chemically reducing at least a portion of these salts to their metallic form to produce a reduction product, and (3) subjecting the reduction product to the high temperature in the inert atmosphere to form the intimate mixture. The salts are usually in solution, normally in water. Copper sulfate, ammonium molybdate, ammonium metatungstate, manganese sulfate, cerium ammonium sulfate and vanadyl sulfate are illustrations of suitable salts which are chemically reducible.

The results of the reduction step depend on the particular reducing agent employed. It is preferred that the reduction be as complete as possible and therefore, the stronger reducing agents are preferred. Oxalic acic is very suitable and hydrazine may also be employed, although its performance under mild reducing conditions depends on the particular salt being reduced.

The defined reduction step and formation of the intimate mixture are considered with respect to portions of the salts and the metals. The language reflects both partial and complete reduction of the salts and formation of the intimate mixture from part or all of the second metal.

The thermally reducible salt is treated to a high temperature in an inert atmosphere for a sufficient time to decompose it and produce the initimate mixture of platinum and the second metal. For the reduction product from the chemically reducible salt the same treatment is utilized to produce the desired intimate mixture. The temperature is above about 500° C., generally about 500–1400° C., and preferably about 700–1400° C. A temperature of about 800° C. has produced very desirable results.

The time of the high temperature treatment is determined from the particular temperature. Normally, about one minute at 800° C. is suitable for the defined reduction product from the chemical reduction step. Longer times up to 60 minutes may be employed, particularly for lower temperatures, but care should be taken to prevent the reduction of surface area of the metals by excessive sintering, although some sintering may be necessary in the formation of the desired intimate mixture.

An inert atmosphere is necessary to prevent oxidation during the treatment. Nitrogen and argon are very suitable for this purpose.

The results of the preparation are an improved electrode which may be a cathode or anode in a low temperature fuel cell employing hydrocarbon or hydrocarbon-derived fuels (preferably ethanol), an oxidant, and acidic or alkaline electrolytes (preferably acidic and especially those formed from $H_2SO_4$). The electrode may also be used in high temperature cells using molten salt electrolytes such as potassium, sodium or lithium hydroxide carbonate, or mixtures thereof. Suitable electrolytes may be further characterized as free, immobilized or membrane type. The optimum amounts of the metals may vary somewhat on the particular type of cell utilized.

The following examples serve to illustrate some embodiments of the invention. It is understood that these are given by way of exemplification and do not in any way serve as limitations on the present invention.

Examples I–IV

Six series of electrodes were prepared, each series composed of approximately 1 wt. percent platinum (relative to the support) containing various amounts of a second metal and supported on a porous graphite disc. Vanadium, copper, manganese, molybdenum, tungsten, and cerium were individually utilized as the second metal in each series.

Each electrode, except in the vanadium series, was prepared by first impregnating a 1 inch diameter by ¼ inch thick porous graphite disc with an aqueous solution containing vanadyl sulfate, copper sulfate manganese sulfate, ammonium molybdate, ammonium metatungstate, or cerium ammonium sulfate. For the vanadium series, the disc was first soaked for approximately 3 hours in 30 wt. percent of $H_2SO_4$. The water was removed by vaporization.

The disc containing the salt was allowed to dry for approximately 30 minutes at about 110° C. and calcined for about 2 minutes at 800° C. ($N_2$) An aliquot of chloroplatinic acid solution necessary to produce 1 wt. percent of platinum (relative to the graphite support) was then impregnated into the discs, after which the discs were again dried and were then allowed to stand overnight (approximately 16 hours) in a desiccator containing hydrazine solution. A 10 vol. percent solution of hydrazine was then added slowly, dropwise, to each disc until it was completely immersed in the solution. This required generally about 10 ml. After standing immersed for approximately 1 hour, the disc was thoroughly washed, dried for approximately 1 hour at about 110° C., and calcined for approximately 1 minute at about 800° C. in nitrogen.

The vanadium, molybdenum, tungsten and cerium electrodes were tested as anodes with lead dioxide as the other electrode; and the copper, manganese, molybdenum, tungsten and cerium electrodes were tested as cathodes with lead as the other electrode. The fuel supplied to the anodes was 30 vol. percent ethanol in 30 wt. percent $H_2SO_4$ (3 parts by vol. of ethanol and 7 parts by vol. of 30 wt. percent aqueous $H_2SO_4$), and the temperature was about 55° C. Oxygen was utilized as the oxidant for the cathodes. The electrolyte was an acid paste made up of approximately 81.5 wt. percent of an aqueous solution of $H_2SO_4$ (30 wt. percent, 12.5 wt. percent of HS5 Cabosil (a silica gel from Geoffrey Cabot, Inc.), and 6.0 wt. percent of S and S269 filter paper pulp.

The cell housing was a stainless steel cylinder with individual cavities for a cartridge heater and the cell. The cathode, electrolyte, and anode were placed in the appropriate cell cavity and surrounded with Teflon rings. A platinum disc was between the cathode and the stainless steel and also served as a contact to the anode.

The cell was tested according to a procedure whereby its internal resistance at end of test and its open circuit voltage were measured. When the open circuit voltage reaches a steady maximum, increasing increments of current are drawn from each cell. Values of voltages and current for each increment were recorded.

The results of the tests are listed in Tables I and II below, together with corresponding results for platinum electrodes (control electrodes) without the second metal but prepared as in the above procedure. The voltages listed below represent the half cell potentials for the platinum-type electrode. These voltages have been corrected for the IR drop. In the tests run with lead dioxide electrode, the half cell potentials are referred to the lead dioxide electrode. In comparing the data from the test, it should be noted that the higher the values of the voltages, the lower the activation polarization for the electrode and the better performance obtained from the electrode. At the higher currents, the effects of concentration polarization may also be noted.

TABLE I.—ANODE VOLTAGE vs. $PbO_2$

| Current, ma./cm.² | Control (Pt) | 1 At. percent V | 5 At. percent V |
|---|---|---|---|
| 2 | 0.99 | 1.04 | 1.01 |
| 6 | 0.75 | 0.95 | 0.90 |
| 10 | 0.61 | 0.88 | 0.81 |
| 20 | 0.48 | 0.73 | 0.61 |
| 40 | 0.33 | 0.41 | 0.48 |

| Current, ma./cm.² | Control (Pt) | 2 At. percent Mo |
|---|---|---|
| 2 | 1.08 | 1.14 |
| 6 | 0.99 | 1.08 |
| 10 | 0.93 | 1.04 |
| 20 | 0.78 | 0.93 |
| 40 | 0.49 | 0.72 |

| Current, ma./cm.² | Control (Pt) | 2 At. percent W |
|---|---|---|
| 2 | 1.08 | 1.10 |
| 6 | 0.99 | 1.04 |
| 10 | 0.93 | 0.99 |
| 20 | 0.78 | 0.89 |
| 40 | 0.49 | 0.75 |

| Current, ma./cm.² | Control (Pt) | 1 At. percent Ce | 2 At. percent Ce |
|---|---|---|---|
| 2 | 1.08 | 1.10 | 1.09 |
| 6 | 0.99 | 1.01 | 1.03 |
| 10 | 0.93 | 0.95 | 0.99 |
| 20 | 0.78 | 0.81 | 0.89 |
| 40 | 0.49 | 0.62 | 0.73 |

TABLE II.—CATHODE VOLTAGE vs. Pb

| Current, ma/cm² | Control (Pt) | 5 At. Percent Cu | 10 At. Percent Cu | 25 At. Percent Cu |
|---|---|---|---|---|
| 2 | 1.02 | 1.10 | 1.11 | 1.11 |
| 6 | 0.93 | 1.03 | 1.02 | 1.03 |
| 10 | 0.86 | 0.96 | 0.95 | 0.96 |
| 20 | 0.72 | 0.81 | 0.70 | 0.78 |
| 40 | 0.48 | 0.56 | | 0.22 |

| Current, ma./cm.² | Control (Pt) | 1 At. Percent Mn | 2 At. Percent Mn | 4 At. Percent Mn | 7 At. Percent Mn |
|---|---|---|---|---|---|
| 2 | 1.02 | 1.06 | 1.03 | 1.08 | 1.11 |
| 6 | 0.93 | 0.97 | 0.93 | 0.98 | 1.04 |
| 10 | 0.86 | 0.90 | 0.85 | 0.91 | 1.00 |
| 20 | 0.72 | 0.73 | 0.65 | 0.71 | 0.90 |
| 40 | 0.48 | 0.50 | 0.38 | 0.28 | 0.74 |

| Current, ma./cm.² | Control (Pt) | 1 At. Percent Mo | 2 At. Percent Mo | 4 At. Percent Mo | 7 At. Percent Mo |
|---|---|---|---|---|---|
| 2 | 1.02 | 1.04 | 1.08 | 1.05 | 1.06 |
| 6 | 0.93 | 0.96 | 0.99 | 0.95 | 0.97 |
| 10 | 0.86 | 0.88 | 0.93 | 0.89 | 0.89 |
| 20 | 0.72 | 0.72 | 0.77 | 0.70 | 0.68 |
| 40 | 0.48 | 0.45 | 0.40 | 0.28 | 0.26 |

| Current, ma./cm.² | Control (Pt) | 4 At. Percent W | 7 At. Percent W |
|---|---|---|---|
| 2 | 1.02 | 1.07 | 1.05 |
| 6 | 0.93 | 0.99 | 0.98 |
| 10 | 0.86 | 0.94 | 0.92 |
| 20 | 0.72 | 0.75 | 0.75 |
| 40 | 0.48 | 0.27 | 0.52 |

| Current, ma./cm.² | Control (Pt) | 2 At. Percent Ce |
|---|---|---|
| 2 | 1.02 | 1.05 |
| 6 | 0.93 | 0.96 |
| 10 | 0.86 | 0.90 |
| 20 | 0.72 | 0.78 |
| 40 | 0.48 | 0.57 |

The results in Tables I and II demonstrate that the platinum electrodes with small amounts of the specified second metals produced higher voltages and therefore lower activation polarization than the control electrodes. At low currents of 2 and 6 ma./cm.², the vanadium anode (from 1 at. percent and 6 at. percent vanadium salt) generated 1.04 and 1.01 volts and 0.95 and 0.90 volt, respectively, compared to 0.99 and 0.75 volt for the control, a very material improvement. The results were also improved for the anodes from the 2 at. percent molybdenum salt, 2 at. percent tungsten salt, and 1–2 at. percent cerium salt; as were the results for the cathodes from 5–25 at. percent copper salt, 1–7 at. percent maganese salt, 1–7 at. percent molybdenum salt, 4–7 at. percent tunsten salt, and 2 at. percent cerium salt. As stated previously, these atomic percentages are based on the platinum salt. The metal content of the manganese, molybdenum and tungsten electrodes was detremined after the tests and found to be about 0.001–0.003 wt. percent of manganese and 0.77–0.85 wt. percent of platinum, based on the support; less than about 0.005 wt. percent of molybdenum and about 0.92–1.2 wt. percent of platinum; and less than about 0.006 wt. percent tungsten and about 0.82–0.95 wt. percent platinum. It appeared that the salts may not have been completely reduced to the metallic form prior to the tests.

Thus having described the invention, what is claimed is:

1. An improved electrode containing an intimate mixture of platinum and a second metal, said second metal being present in an amount of less than 5 weight percent of said platinum, and said platinum being present in an amount of less than 10 weight percent of said electrode, said second metal being at least one member of the group consisting of vanadium, copper, manganese, molybdenum, tungsten, and cerium, said electrode being prepared by (1) impregnating a porous non-metallic support with salts of platinum and said second metal to produce a codispersion of said salts, (2) reducing at least a portion of said salts to their metallic form to produce a reduction product, and (3) treating said reduction product at a temperature of from about 700° C. to about 1400° C. in an inert atmosphere for a sufficient time to produce said intimate mixture composed of a portion of said platinum and at least a portion of said second metal, said treatment resulting in an electrode which exhibits reduced activation polarization when employed in an electrochemical cell.

2. The electrode of claim 1 wherein said salts are vanadyl sulfate and platinic acid, and said temperature is about 800° C.

3. The electrode of claim 1 wherein said salts are copper sulfate and platinic acid, and said temperature is about 800° C.

4. The electrode of claim 1 wherein said salts are manganese sulfate and platinic acid, and said temperature is about 800° C.

5. The electrode of claim 1 wherein said salts are cerium ammonium sulfate and platinic acid, and said temperature is about 800° C.

6. The electrode of claim 1 wherein said salts are ammonium meta tungstate and platinic acid, and said temperature is about 800° C.

References Cited
UNITED STATES PATENTS

| | | | |
|---|---|---|---|
| 2,615,932 | 10/1952 | Marko et al. | 136—122 |
| 3,077,507 | 2/1963 | Kordesch et al. | 136—120 X |
| 3,212,930 | 10/1965 | Thompson et al. | 117—213 X |
| 3,296,025 | 1/1967 | Holt et al. | 117—227 |

OTHER REFERENCES

Weissberger, A.: Technique of Organic Chemistry, volume II, Interscience Publishers, Inc., N.Y. (1948), page 10, paragraph E relied on.

WINSTON A. DOUGLAS, Primary Examiner

O. F. CRUTCHFIELD, Assistant Examiner